United States Patent [19]

Boghosian

[11] 3,912,490

[45] Oct. 14, 1975

[54] PLANT AND SOIL OXYGENATING COMPOSITION AND METHOD

[76] Inventor: Malcolm P. Boghosian, 4632 Cerritos Drive, Long Beach, Calif. 90807

[22] Filed: Jan. 14, 1974

[21] Appl. No.: 433,395

[52] U.S. Cl............................ 71/28; 71/63; 71/64 SC
[51] Int. Cl.²........................................... C05C 9/00
[58] Field of Search........... 71/1, 28, 29, 30, 31, 35, 71/48, 49, 53, 63, 64 SC; 260/553 R, 555 R, 555 C, 610 R, 610 C; 423/579, 582; 252/186

[56] References Cited
UNITED STATES PATENTS

| | | | |
|---|---|---|---|
| 2,740,689 | 4/1956 | Easton et al. | 252/186 |
| 3,629,331 | 12/1971 | Kabacoff et al. | 260/555 R |

Primary Examiner—Frank A. Spear, Jr.
Assistant Examiner—Ferris H. Lander
Attorney, Agent, or Firm—Martin A. Voet

[57] ABSTRACT

A method for oxygenating plant roots and soil by contacting the plant roots, soil and/or support media adjacent to the plant with a composition comprising an effective amount of urea peroxide or hydrogen peroxide, or compositions of the above in combination with the macronutrients and micronutrients needed for plant growth. These compositions may additionally contain a suitable buffer, and other agents to enhance stability, increase penetrability, prevent soil aggregation, improve water holding capacity, and to prevent rusting of various containers. These compositions also may be used in conjunction with a suitable catalyst to increase the rate of oxygen release.

12 Claims, No Drawings

PLANT AND SOIL OXYGENATING COMPOSITION AND METHOD

BACKGROUND OF INVENTION

1. Field of the Invention

The present invention relates to a method of enhancing plant growth and treatment of the soil. More particularly, the present invention relates to a composition and method of enhancing plant growth and treating the soil by delivering oxygen to the roots of plants or to the soil and/or support media adjacent to the plant.

2. Background of the Prior Art

It has long been known that proper soil aeration is essential for the growth of most plants. It is believed that the air (oxygen) from the atmosphere diffuses into the soil to elicit its activity. To achieve better aeration of soils many methods have been used — fields are plowed, soil conditioners are used to change the granular structure of the soil, special devices are made to mechanically increase the air-soil surface ratio for potted plants and for trees planted in orchards and the like. The type of structure of the soil and the amount of water delivered to it and its water holding capacity play an important role in soil aeration. There are different types of soils, such as sandy loam, loam and heavy clays. These soil types differ in the amount of coarse sand, fine sand, silt and clay present. The soils differ in their rate of drainage, water holding capacity, and most important air space. These factors are all important as optimally the soil should hold sufficient moisture, yet have adequate area available for the diffusion of air (oxygen) from the atmosphere. Clays hold more water and have less air space, sand holds less water, but provides the greatest air space.

Plants can tolerate a range of concentration of air or oxygen in the soil, however, the concentration will effect the rate of growth of the roots and shoots. Different plants will tolerate different concentrations of oxygen in the soil; generally a minimum of 8 to 10 percent is needed for good growth. Soils having less than 10 to 12 percent of their volume as pore space free of water when the soil is at field capacity are likely to be poorly aerated.

It is well known that overwatering of plants in fields or pots may cause poor plant growth, or even death of the plant. One of the first evidences of overwatering is the yellowing and dropping of leaves. Further, roots and shoots will stop growing and the plant will finally die. It also has been demonstrated that root growth, shoot growth, water uptake and mineral uptake are all diminished when plants are given too much water or too little air. The reasons for poor plant growth due to overwatering are not completely or clearly understood but are normally attributed to the filling of pore spaces in the soil where air normally harbors. In addition to oxygen other nutrients are also needed for good plant growth. Most important of these are nitrogen, potassium and phosphate. These are termed the macronutrients. Micronutrients are also important to plant growth. The concentrations of various plant nutrients have been well investigated and many different formulations have been suggested. A number of plant fertilizers are commercially available and are described as 5-5-5, 10-10-10 or 4-10-10 and the like. This refers to the ratio of nitrogen to phosphate (usually as $P_2O_5$) to potassium (usually as $K_2O$) available from the combination. Different plants need different ratios and combinations of these macronutrients for most efficient growth, fruiting and flowering. The pH of these solutions or powders are likewise adjusted depending upon the type of plant that will be fertilized. Most plants require a pH of about 5 to 7 for optimal growth.

SUMMARY OF THE INVENTION

It has now been discovered that the problems associated with poor plant growth due to insufficient aeration or overwatering can be overcome by treating the soil or other support media adjacent to the plant with an effective amount of urea peroxide or hydrogen peroxide.

It has also been discovered that treating the soil or other support media adjacent to a plant with an effective amount of urea peroxide or hydrogen peroxide enhances plant growth. It has also been discovered that treating the soil or other support media adjacent to tomato plants with an effective amount of urea peroxide or hydrogen peroxide enhances the production of solids in tomatoes.

It has also been discovered that treating the soil or other support media adjacent to desiduous plants with an effective amount of urea peroxide or hydrogen peroxide prolongs the growth period of the desiduous plants.

It has also been discovered that soils which are unsuitable for plant growth by virtue of poor aeration caused by soil type, e.g. clay or by soil conditions e.g. compacted, may be rendered suitable for growing plants by treating the soil with an effective amount of urea peroxide or hydrogen peroxide. It has also been discovered that coating or encapsulating the urea peroxide or hydrogen peroxide with or without macro or micro nutrients will allow these agents to be delivered to a plant in a predetermined manner.

The present invention further relates to a composition comprising a water dilutable concentrate containing about 0.1 to about 60 percent urea peroxide or an equivalent amount of hydrogen peroxide, together with plant macronutrients and/or micronutrients having a resultant pH of about 5 – 7.

A preferred composition comprises a water dilutable concentrate containing about 0.5 percent to about 5 percent urea peroxide or an equivalent amount of hydrogen peroxide together with 0.7 to about 17 percent potassium phosphate buffer and about 0.01 to about 0.1 percent EDTA and sufficient phosphoric acid to bring the pH to between about 5 and 7. In addition, the preferred composition may be used in conjunction with a catalytically effective amount of manganese dioxide.

DETAILED DESCRIPTION OF THE INVENTION

Urea peroxide is a well known commercially available chemical. Urea peroxide is well adapted for the present invention in that, in addition to solving the problems of soil aeration, its breakdown products add nitrogen to the soil and do not leave any toxic residues in the soil or plant.

Urea peroxide is available in powder form, which will allow other than liquid dose forms to be easily prepared, e.g. urea peroxide can be coated or encapsulated so as to release oxygen at a controlled and slower rate, alleviating constant application. The encapsulation process allows the urea peroxide to be delivered in combination with other plant nutrients that would normally cause the breakdown of urea peroxide, such as copper, iron and the like.

Hydrogen peroxide is a well known commercially available chemical. Hydrogen peroxide is well adapted for the present invention, in that, in addition to solving the problems of soil aeration, is breakdown products are water and oxygen leaving no toxic residues to the soil or plants so treated.

Suitable conventional macro and micronutrients, as well as other additives, for example, chelating agents suuch as ethylenediaminetetraacetic acid (EDTA) and its salts, penetrating agents, such as suitable surfactants, and methylcellulose may also be added to the hydrogen peroxide or urea peroxide.

The term "support media" as used in the present invention refers broadly to all media in which plants are grown. The term includes soils such as sand, clay, loam, gravel, water and mixtures thereof.

The amount of urea peroxide which can be used in the present invention varies with the intended use and soil type, e.g., sand, clay, etc .... For indoor plants, potted plants, yard plants and field plants, the amount of urea peroxide generally ranges from about 0.01 to about 6 grams/cubic foot of soil and preferably 0.05 to about 1 gram/cubic foot of soil. For soil treatment, the amount of urea peroxide generally ranges from about 0.15 to about 8,000 grams/cubic foot of soil and preferably 0.15 to about 57 grams/cubic foot of soil. The amount of hydrogen peroxide which may be used in the present invention is approximately 36 percent of the amount specified for urea peroxide.

Table 1 below, shows representative concentrations of urea peroxide which may be used with various plants and soils.

Table 1

| Condition | Preferred | Urea Peroxide (gms. 100ml) Range |
|---|---|---|
| Indoor pots (not drained) | | |
| Large | 0.012 | 0.001 – 0.1 |
| Small | 0.009 | 0.001 – 0.1 |
| Potted Plants (drained) | | |
| Large | 0.012 | 0.001 – 0.1 |
| Small | 0.009 | 0.001 – 0.1 |
| Normal yard plants | 0.018 | 0.001 – 0.1 |
| Field Plants and Crops | 0.018 | 0.001 – 0.1 |
| Flooded Soil Treatment (no crops or plants) | 1.0 | 0.01 – 100 |
| Non-Flooded Field Treatment (no crops or plants) | 1.0 | 0.01 – 100 |

The addition of an appropriate buffering agent, such as, for example, potassium phosphate buffer, can deliver to the plant the proper concentrations of potassium and phosphate ions while maintaining pH and the stability of the urea peroxide containing formulation. The amount of buffering agent which can be used in the present invention ranges from about 0.3 percent to about 86 percent by wt, and preferably between 0.7 percent and about 17 percent by weight.

Other agents such as ethylene diamine tetraacetic acid (EDTA) and its salts can also be added to further stability and to prevent rusting, where plants are placed in wire baskets, due to the oxidizing effects of urea peroxide. The amount of EDTA which can be used in the present invention ranges from about 0.01 to about 10 percent by weight of urea peroxide and preferably between about 0.02 and about 2.0 percent by weight of urea peroxide.

Conventional surfactants may be used to aid the penetration and distribution of the peroxide and other nutrients in the soil. Suitable surfactants are those which will not degrade or cause degradation of the urea peroxide and may be used in the present invention in ranges from about 0.1 percent to about 50 percent and preferably between about 0.25 percent and about 3 percent by weight of urea peroxide.

The formulas can be altered to best suit the soil and the degrading properties and water holding properties of the soil. A higher concentration formula can be used to treat soils that cause fast destruction of the peroxide and lower concentrations to treat soils that degrade the peroxide poorly. Manganese dioxide has been found to act as a catalyst for urea peroxide enhancing release of nasient oxygen. The amount of manganese dioxide which can be used in the present invention ranges from about 0.1 grams to about 10 grams per cubic foot of soil and preferably between about 0.5 grams and about 1.5 grams per cubic foot of soil. Manganese dioxide powder may be added to soils that degrade peroxide poorly as a fine powder that will distribute itself throughout the soil mixture rapidly with watering and give good catalytic power to the soil. Higher concentrations of the formula can be used to treat soils which have been flooded, but which have not been planted.

The formulations are not limited to those of the examples but include solid dose forms, suitably prepared, such as encapsulated or coated forms of urea peroxide in combination with, or not in combination with suitable fertilizing and pH adjusting ingredients.

Encapsulated or coated urea peroxide can be prepared using such polymeric materials as ethylcellulose. The amount and type of coating or encapsulation can regulate the rate at which the capsules dissolve and release the urea peroxide. This allows higher concentration formulas to be prepared, while the amount available to the soil can be regulated to the amount found suitable for a particular application. Encapsulation makes possible less frequent application and admixture with many other plant nutrients which normally would cause its degradation.

To illustrate the manner in which this invention may be carried out, the following examples are given. It is understood, however, that the examples are for the purpose of illustration and the invention is not to be regarded as necessarily limited to any or all of the specific materials or conditions therein, unless otherwise indicated.

EXAMPLE I

A. Three tomato plants were grown in nutrient solutions in suitable containers. After the root structure had developed the nutrient solutions were removed and replaced with the solutions shown below (solution No. 1, No. 2, and No. 3). Solution No. 4 alone, without a plant was used as the control. Oxygen was noted to be present or absent by the formation of oxygen bubbles at the roots or in the solutions.

Solution No. 1 - - - Urea peroxide 0.018% w/v, potassium phosphate, distilled water. The solution pH was adjusted to 6.0.

Solution No. 2 - - - Urea, potassium phosphate, distilled water, pH adjusted to 6.0. The concentration of the urea and the potassium phosphate are the same as in solution No. 1 above.

Solution No. 3 - - - Distilled water

Solution No. 4 - - - Same as solution No. 1 above.

Oxygen bubbles were found to accumulate on the roots of the plant in solution No. 1 only and not in the other solutions. It was concluded that tomato roots have the power to cause the release of oxygen bubbles from solutions of urea peroxide.

B. Equal quantities of various soils and planting materials were each added to 1000 ml. of a solution having the same composition as solution No. 1, under A above. The relative oxygen releasing power of the materials were ranked in relation to the quantity of air bubble formation. Materials that caused the greatest release of oxygen were given a 4+ ranking while those that did not cause release were given a (−) ranking. Table 1 below demonstrates the relative ranking of oxygen release caused by the various materials.

Table 1

| Material | Relative ranking of Oxygen release |
| --- | --- |
| Water | − |
| Manganese dioxide | ++++ |
| Black Magic Potting Soil* | ++++ |
| Supersoil* | ++++ |
| Park Nursery Plant Mix* | +++ |
| Park Nursery Potting Mix | ++ |
| Sand | ++ |
| Park Nursery Potting Mix* plus manganese dioxide | ++++ |
| Vermiculite | + |
| Perlite-volcanic rock | − |

*Commercially available planting mixes generally containing mixtures of sponge rock, sand and composted redwood or peatmoss.

Planting soils and mixes have varying degress of reactivity with urea peroxide to cause the release of oxygen. The reactivity of the soil can be enhanced by the addition of manganese dioxide.

C. 100 milliliters of each of the following solutions No. 1, No. 2 and No. 3 were placed into glass beakers, and to each was added 20 milligrams of manganese dioxide powder. Solution No. 1 was a solution of urea peroxide, solution No. 2 was a solution of hydrogen peroxide and solution No. 3 was distilled water. Oxygen release was determined by the formation of oxygen bubbles in the solution. The solutions were then allowed to sit several days, and then assayed to determine whether or not any manganese dioxide went into solution. The results of the experiment appear in Table 2 below.

Table 2

| Solution | | Oxygen Release | Manganese dioxide in solution |
| --- | --- | --- | --- |
| No. 1 | Urea peroxide | yes | no |
| No. 2 | Hydrogen peroxide | yes | no |
| No. 3 | Distilled water | no | no |

It was concluded that manganese dioxide acts as a catalyst to cause the release of oxygen from solutions of hydrogen peroxide and urea peroxide.

EXAMPLE II

Several basic formulas were prepared and tested for effects on various plants to determine plant growth, root growth, shoot growth and toxicity to the roots and plant system.

---

FORMULA I

| | |
| --- | --- |
| Urea peroxide | 0.18 grams |
| Potassium phosphate | 0.06 |
| Dipotassium phosphate | 0.08 |

Mix dry powders in dehumidified room and maintain exclusion of moisture by suitable packaging.
Normal dilution: Dilute 0.32 grams in one liter of water. This gives a concentration of 0.018% w/v urea peroxide.

FORMULA II

| | |
| --- | --- |
| Urea peroxide | 3.6 grams |
| Potassium phosphate | 2.173 |
| Dipotassium phosphate | .625 |
| Phosphoric acid to pH 6.0 | |
| Distilled water to make | 100 ml. |

Normal dilution: dilute 5 ml to a liter with water. This gives a concentration of 0.018% w/v urea peroxide. One-half the normal dilution gives a urea peroxide concentration of 0.009% w/v and one-fourth the normal dilution gives a urea peroxide concentration of 0.0045% w/v.

FORMULA III

| | |
| --- | --- |
| Urea peroxide | 1.8 grams |
| Potassium phosphate | 2.173 |
| Dipotassium phosphate | .625 |
| Phosphoric acid to pH 6.0 | |
| Distilled water to make | 100 ml |

Normal dilution: dilute 5 ml to one liter with water to give a urea peroxide concentration of 0.009% w/v.

FORMULA IV

| | |
| --- | --- |
| Urea | 2.298 grams |
| Potassium phosphate | 2.173 |
| Dipotassium phosphate | .625 |
| Phosphoric acid to pH 6.0 | |
| Distilled water to make | 100 ml |

Normal dilution: dilute 5 ml to one liter of water. This dilution gives the same concentration of nitrogen, phosphate and potassium as in Formula II above, but no peroxide.

FORMULA V

| | |
| --- | --- |
| Urea peroxide | 2.34 grams |
| Potassium phosphate | 2.173 |
| Dipotassium phosphate | .625 |
| Phosphoric acid to pH 6.0 | |
| Distilled water to make | 100 ml |

Normal dilution: dilute 5 ml to one liter of water to give a urea peroxide concentration of 0.012% w/v.

-Continued

FORMULA VI

| | |
|---|---|
| Urea peroxide | 1.35 grams |
| Urea | 1.43 |
| Potassium phosphate | 2.173 |
| Dipotassium phosphate | .625 |
| Phosphoric acid to pH 6.0 | |
| Distilled water to make | 100 ml |

Normal dilution: dilute 5 ml to one liter of water to give a urea peroxide concentration of 0.00675% w/v and a concentration of nitrogen, phosphate and potassium the same as Formula II above.

FORMULA VII

| | |
|---|---|
| Urea peroxide | 1.35 grams |
| Potassium phosphate | .815 |
| Dipotassium phosphate | .234 |
| Phosphoric acid to pH 6.0 | |
| Distilled water to make | 100 ml |

Normal dilution: dilute 5 ml to one liter with water to give a urea peroxide concentration of 0.00675% w/v. This formula contains the same concentration of urea peroxide as Formula VI. The concentration of phosphate and potassium is the same as found in Formula IX.

FORMULA VIII

| | |
|---|---|
| Urea peroxide | 3.6 grams |
| Potassium phosphate | 2.173 |
| Dipotassium phosphate | .625 |
| Stannic chloride, pentahydrate | .012 |
| Phosphoric acid to pH 6.0 | |
| Distilled water to make | 100 ml |

Normal dilution: dilute 5 ml to one liter with water to give a concentration of urea peroxide of 0.018% w/v.

FORMULA IX

| | |
|---|---|
| Urea | 0.86 grams |
| Potassium phosphate | 0.815 |
| Dipotassium phosphate | 0.234 |
| Phosphoric acid to pH 6.0 | |
| Distilled water to make | 100 ml |

Normal dilution: dilute 5 ml to one liter with water.

FORMULA X

| | |
|---|---|
| Urea peroxide | 1.8 grams |
| Potassium phosphate | 2.173 |
| Dipotassium phosphate | .625 |
| Tripotassium ethylene diamine tetraacetic acid (EDTA) 50% soln. | .04 ml |
| Phosphoric acid to pH 6.0 | |
| Distilled water to make | 100 ml |

Normal dilution: dilute 5 ml to one liter with water to give a urea peroxide concentration of 0.009% w/v.

FORMULA XI

| | |
|---|---|
| Hydrogen peroxide solution 3% | 21.66 ml |
| Urea | 1.15 grams |
| Potassium phosphate | 2.173 |
| Dipotassium phosphate | .625 |
| Adjust pH to 6.0 | |
| Distilled water to make | 100 ml |

Normal dilution: dilute 5 ml to one liter with water to give a hydrogen peroxide concentration of 0.00325% w/v. 0.00325% w/v hydrogen peroxide is equivalent to 0.009% w/v urea peroxide in peroxide content.

FORMULA XII

| | |
|---|---|
| Urea peroxide | 1.8 grams |
| Phosphoric acid to pH 6.0 | |
| Distilled water to make | 100 ml |

Normal dilution: dilute 5 ml to one liter with water to give a urea peroxide concentration of 0.009% w/v.

FORMULA XIII

| | |
|---|---|
| Hydrogen peroxide solution 3% | 21.66 ml |
| Adjust pH to 6.0 | |
| Distilled water to make | 100 ml |

Normal dilution: dilute 5 ml to one liter with water to give a hydrogen peroxide concentration of 0.00325% w/v. This concentration of hydrogen peroxide is equivalent to 0.009% w/v urea peroxide.

EXAMPLE III

An experiment was conducted to find the toxic concentration of urea peroxide. 14 tomato plants were transplanted into 4 inch clay pots. 10 were transplanted using Supersoil* and four with a 55 mix of vermiculite and Supersoil. Plant treatment was as follows:

a. Three plants in Supersoil, the pots containing bottom collecting dishes, were watered with water alone.

b. Three plants in Supersoil, in pots without bottom collecting dishes, were watered with water alone.

c. Three plants in Supersoil, the pots containing bottom collecting dishes, were watered with Formula I of Example II, using 0.6 grams diluted to a liter with water to give a concentration of 0.0338% w/v urea peroxide.

d. Three plants in a 55 mixture of vermiculite and Supersoil, in pots containing a bottom collecting dish, were watered with the same solutions as in (c) above.

e. One plant in Supersoil, in a pot containing a bottom collecting dish, was watered with 0.6 grams of Formula I of Example II in 250 ml of water to give a concentration of urea peroxide of 0.135% w/v.

f. One plant in Supersoil, in a pot containing a bottom collecting dish, was watered with 0.6 grams of Formula I of Example II diluted in 125 ml of water to give a concentration of urea peroxide of 0.25% w/v.

*Commercially available planter mix containing a mixture of sponge rock, sand and composted redwood.

The plants were watered eight times in 12 days. The plants were then sacrificed and the roots examined. The results appear in Table 3 below.

Table 3

| Plant | No. Plants | Urea Peroxide grams/100 ml | Drainage allowed | Comments |
|---|---|---|---|---|
| a. | 3 | 0 | no | long white roots |
| b. | 3 | 0 | yes | long white roots |
| c. | 3 | 0.034% | no | root tips growing but roots shorter and thicker than (a) and (b) above. |
| d. | 3 | 0.034 | no | root tips growing but roots shorter and thicker than (a) and (b) above. |
| e. | 1 | 0.135 | no | roots still growing but brownish. Much shorter than (a) and (b) above. |
| f. | 1 | 0.270 | no | roots dead and totally brown. |

The solution that collected in the bottom collecting dishes was assayed for peroxide content and found not to have completely degraded. The amount of soil in the four inch pots and the fast drainage did not allow sufficient time or amount of material to degrade all the peroxide added.

The results show that the upper safe limit of concentration for urea peroxide is approximately 0.034% w/v and that total toxicity to plant growth occurs when the concentration is approximately 0.135 – 0.270% w/v urea peroxide in a small quantity of soil or in soil with insufficient catalytic power to degrade the peroxide.

EXAMPLE IV

To demonstrate the effect and safety of urea peroxide in the treatment of soil, 1 quarter pound of pure urea peroxide was added to an 8 inch pot containing Park Nursery Plant mix. This was watered in with noticeable reaction and fizzing. A day later the pot was again flooded with water. 8 hours later a tomato plant was planted in the soil and it grew exceptionally well. Urea peroxide does not leave toxic residues in the soil if drainage is allowed. The urea peroxide must be diluted below the concentration shown to be toxic in Example III. If drainage cannot be achieved then hydrogen peroxide is preferred to avoid toxic concentrations of residual urea in the soil.

EXAMPLE V

Five *Ficus benjamina* plants (1 gallon size) were transplanted into 5 gallon plastic containers, using Supersoil. The containers were placed into plastic trays which served as bottom plates. The plants were kept outdoors under a canopy which restricted 55% of the sunlight. The plants were left to adjust 1 week before watering with the experimental solutions. The plants were watered every second day with 1000 ml of experimental solution of Example II for a period of 85 days. Photographs were taken against a special grid at days 0, 7, 20, 35, 49 and 85. Plant growth was determined by counting the number of grid squares which were covered by the leaves. The square root of this figure was then cubed and the resultant data was subjected to linear regression analysis to determine the slope of the best line thru the data points and the coefficient of correlation for the line was calculated. The data of the experiment appears in Table 4. Table 5 similarly compares the rate of growth of three plants watered with solutions all having the same urea content but differing in the urea peroxide content.

Table 4

| Experimental Solution of Example II | Urea Peroxide gms/100 ml | Total Urea Content gms/100 ml | Slope of line | Coefficient of Correlation |
|---|---|---|---|---|
| III | 0.009 | 0.006 (A) | 6.56 | .99 |
| V | 0.012 | 0.008 (A) | 6.50 | .99 |
| II | 0.018 | 0.0115 (A) | 4.09 | .96 |
| IV | — | 0.0115 (B) | 3.92 | .97 |
| IX | — | 0.004 (B) | 4.57 | .95 |

*(A) urea content wholly as urea peroxide
(B) urea content, not as urea peroxide Table 5

| Experimental Solution of Example II | Urea Peroxide gms/100 ml | Total Urea Content gms/100 ml | Slope of line | Coefficient of Correlation |
|---|---|---|---|---|
| II | 0.018 | 0.0115 | 4.09 | .96 |
| IV | — | 0.0115 | 3.92 | .97 |
| VI | 0.0065 | 0.0115 | 8.14 | .96 |

The two sets of data demonstrate that *Ficus benjamina* plants in soil grow best when the concentration of urea peroxide is approximately 0.0065% w/v to approximately 0.012% w/v. Lower concentrations of urea are necesssary for food growth when in the presence of urea peroxide. In Table 5 the growth rate was practically doubled when 0.0065% w/v urea peroxide was used as compared to the control. Higher concentrations i.e. 0.018% w/v urea peroxide did not show a similar enhancement of growth, however, this concentration did not inhibit growth. The soil in containers watered with a urea peroxide-containing formula were drier and had little or no excess solution in their drainage trays as compared to the soil in containers that were not treated with urea peroxide. Water uptake or usage was enhanced by the presence of the peroxide.

EXAMPLE VI

12 *Ficus pandurata* (Fiddleleaf fig) in 6 inch clay pots were selected. The drainage of seven pots (No. 9, No. 12, No. 13, No. 14, No. 15, No. 16, No. 17) were obstructed by placing a cork securely into the drainage whole. The remaining five plants (No. 1, No. 4, No. 5, No. 7, No. 8) were allowed to drain freely. Before starting the experiment the number of leaves of each plant were counted. Photographs were taken at the start and periodically during the experimental period. Approximately 300 ml of each experimental solution of Example II as shown below in Table 6 was used for each watering. The plants were watered 48 times during a period of 123 days. Solutions of urea peroxide and hydrogen peroxide were used in the experiment. The concentrations of total urea, urea peroxide, hydrogen peroxide and ethylene diamine tetraacetic acid as the potassium salt are shown in Table 6 below.

Table 6

| Plant No. | Soln No. of Example II | Solution Composition | | | |
|---|---|---|---|---|---|
| | | Total urea content gms/100 ml | Urea peroxide gms/100 ml | Hydrogen peroxide gms/100ml | EDTAK gms/100ml |
| 1 & 9 | III | 0.006 | 0.009 | — | — |
| 4 & 12 | X | 0.006 | 0.009 | — | 0.001 |
| 5 & 13 | XI | 0.006 | — | 0.00325* | — |
| 14 | XII | 0.006 | 0.009 | — | — |
| 15 | XIII | — | — | 0.00325* | — |
| 7 & 16 | II | 0.0115 | 0.018 | — | — |
| 8 & 17 | water | — | — | — | — |

*0.00325% w/v hydrogen peroxide is equivalent in peroxide content to 0.009% w/v urea peroxide.

In Table 7 below are the results of the experiment under the drained and undrained conditions.

Table 7

| Plant No. | Pots not drained | | | Plant No. | Pots drained | | |
|---|---|---|---|---|---|---|---|
| | Soln. No. Example II | No. Leaves Start | End | | Soln. No. Example II | No. Leaves Start | End |
| 9 | III | 10 | 10 | 1 | III | 13 | 11 |
| 12 | X | 10 | 8 | 4 | X | 11 | 11 |
| 13 | XI | 10 | 10 | 5 | XI | 11 | 11 |
| 14 | XII | 10 | 10 | — | — | — | — |
| 15 | XIII | 11 | 12 | — | — | — | — |
| 16 | II | 7 | 2 | 7 | II | 9 | 9 |
| 17 | water | 10 | 5* | 8 | Water | 9 | 9 |

*three of five leaves dead and totally brown.

It is concluded that formula II of Example II, 0.018% w/v urea peroxide, is too concentrated for an undrained container, but suitable for a drained container. Concentrations of urea peroxide or hydrogen peroxide 0.009% w/v and 0.00325% w/v respectively are suitable for undrained and drained potted plants and these peroxide solutions show a protective action against overwatering effects of water alone in the undrained pot while not injuring the plant. Water alone in an undrained pot severely damages the plant and causes the leaves to turn brown and drop, but does not cause the same action in a well drained container.

EXAMPLE VII

Two tomato plants were planted in 5 gallon containers using Supersoil as the soil. One plant was watered using Formula II of Example II, 40 ml diluted to 2 gallons of water and used for watering every other day. The plant was watered 49 times during a 99 day period. The other plant served as a control and was watered using water alone. Both plants were treated similarly as to fertilization, application of insecticides and the such. The tomato plants grew well and produced a crop of tomatoes of good size and shape. The tomatoes watered with the experimental solution were very heavy in weight and when sliced open had a concentration of solids higher than normal and a higher concentration than the control plant. Taste was not affected.

EXAMPLE VIII

Two 6 foot fall *Ficus benjamina* plants which had been severely overwatered, lost 50 to 75 percent of their leaves, many leaves yellowed, shoots would not open and a small amount of water added to the soil caused flooding of the soil and an excess amount of water in the bottom holding dish.

Both plants were used in the experiment. To the soil of plant No. 1, 10 grams of the peroxide catalyst, manganese dioxide was added and the soil of plant No. 2 was not altered. Both plants were then watered approximately every other day using Formula II of Example II, 5 ml diluted to a liter of water. Plant No. 1 was watered 90 times during a 180 day period and plant No. 2, 86 times in a 181 day period, using approximately 1 liter of solution per watering. The excess solution in the bottom plate was found by assay to be devoid of peroxide content.

After one or two additions of Formula II, leaves stopped dropping and shoots started opening. After four to five additions the soil became drier, less solution was found in the bottom plate, the leaves became moist, the color of the leaves started to turn dark green and yellowing of leaves had stopped. After a few weeks of treatment many new leaves had formed and the plants grew well. The roots were examined at the beginning and end of the experimental period and likewise were found to have grown. Both plants reacted in the same fashion. The addition of Formula II, 0.018% w/v urea peroxide, to the soil of these two plants quickly reversed the overwatered condition of the plants, even though 1 liter of solution was added every other day. The experimental urea peroxide formula caused shoots to open, new shoot and leaf production and uptake of water and nutrients. Manganese dioxide did not harm the plant.

EXAMPLE IX

Three 6 to 8 foot tall *Ficus benjaminas* and two *Ficus panduratas* (Fiddlefigs), 5 to 7 feet tall, respectively, were dying due to overwatering. Prior to starting the experiment the leaves of the Ficus plants were yellowing and many leaves would drop if the plant was shaken; 25 to 90 percent of the leaves had dropped from the various plants. New shoots would not open. Various conventional watering and fertilizing schedules were tried to save the plants without success.

The five plants were watered with Formula V of Example II, 5 ml diluted to 1 liter with water. For the first watering the plants were taken outdoors and the soil was flooded with 2 gallons of Formula V and let drain. The plants were then taken indoors and watered every other day for 12 days using 1 liter of experimental solution per watering. After the first watering, the leaves of the *Ficus benjamina* stopped dropping and after 1 week shoots began to open and new shoots began to grow. No further leaves dropped from the *Ficus pandurata* and shoots began to open approximately a month later.

The solution of Formula V stopped the leaf dropping, stimulated shoots to open and caused the production of new shoots. This solution containing 0.012% w/v urea peroxide reversed the overwatered condition of these plants.

EXAMPLE X

The effect and safety of Formula II of Example II was tested on a variety of potted plants (identified in Table 8 below), in which drainage was allowed. The plants used were obtained from a nursery. The plants were in poor condition, many of the leaves had dropped and no new growth or shoot production was evident. The experiment was accomplished outdoors.

The plants were flooded every second day with Formula II and Formula IV of Example II, 5 ml diluted to 1 liter with water or with water alone. The immediate effect of these solutions on the plants can be seen in Table 8 below.

EXAMPLE XI 25, 1 gallon size, Boxwood Hedges were planted outdoors in clay soil 6 months prior to the experiment. Five of the 25 Boxwood hedge plants were growing poorly and had a large number of yellow leaves on each plant. These plants were situated in an area where water pooled. These five plants were watered using the experimental solution Formula II of Example II, 40 ml diluted to 2 gallons of water, six times during a period of 22 days. By the end of the watering period the appearance of yellow leaves stopped. The plants started growing (they were stunted in comparison to the rest of the Boxwood plants). The plants began to turn green and new shoots developed.

EXAMPLE XII

An indoor grown Kentia palm with chlorosed leaves and brown leaf tips, was transplanted into a 5 gallon earthenware pot using Supersoil. The dead parts of the leaves were trimmed and dead branches removed. The plant was watered 63 times during a period of 127 days using 1 liter of diluted Formula II of Example II per watering.

After 12 days a new shoot opened. After 30 days three new shoots opened. The plant grew well. Toward the end of the experimental period some browning at the leaf tips was noticed.

EXAMPLE XIII

An indoor grown Reiger Begonia in a 6 inch pot, which had almost died was taken from its soil by washing the roots with a strong stream of water. The plant was severely trimmed back and planted into a heavy Table 8

| Plant | Plant Description | Number of times watered/days | Treatment Formula of Example II | 10 day observations |
|---|---|---|---|---|
| 1 | Boston Fern | 60/126 | II | Some new growth |
| 2 | Boston Fern | 60/126 | IV | Some new growth |
| 3 | Boston Fern | 60/126 | II | Some new growth |
| 4 | Boston Fern | 60/126 | IV | Some new growth |
| 5 | Fishtail Palm | 60/126 | II | No change |
| 6 | Reiger Begonia | 60/126 | II | New leaves- dark color |
| 7 | Reiger Begonia | 60/126 | II | New leaves- dark color |
| 8 | Reiger Begonia | 60/126 | IV | Leaves become dark colored |
| 9 | Reiger Begonia | 60/126 | WATER | No change |
| 10 | Tall Palm | 60/126 | II | Leaves become dark colored |
| 11 | Tall Palm | 60/126 | IV | Leaves become dark but burnt ends |
| 12 | Bella Palm | 60/126 | II | Leaves become dark new shoots appear |
| 13 | Bella Palm | 60/126 | II | Leaves become dark new shoots appear |
| 14 | Philidendron Panthos | 60/126 | II | New shoots appear- Rusted Wire Post |

Nutrients are taken up by the plants quickly, to dissipate the chlorosed look and make the leaves darker. The solution containing the peroxide stimulated greater shoot production, as compared to the controls, and plant recovery. Formula II did not harm any of the above plants when allowed to drain during the 126 day experimental period.

clay soil. The plant was sprayed with Benolate, a mildewcide. To the soil was added approximately ½ teaspoonful of manganese dioxide powder. The plant was watered 76 times during a period of 152 days using Formula II of Example II, 40 ml diluted to 2 gallons of water and the pot was flooded during each watering.

After 6 days of this treatment flowers opened which previously would not open. The plant grew well and became quite large. No toxic effects of manganese dioxide or the formula were noted during the experimental period.

EXAMPLE XIV

The indoor plants listed in Table 9 below, were selected in pairs and the pairs were so matched that they were equivalent in size, shape and condition.

Table 9

| PLANT NUMBER | PLANT NAME FORMAL NAME | PLANT NAME COMMON NAME |
| --- | --- | --- |
| No. 1 | Chamaedorea Elegans Bella | Neantha Bella Palm |
| No. 2 | Ficus Lyrata | "Pandurata" Fiddle Leaf Fig |
| No. 3 | Dracaena Craigii | |
| No. 4 | Davalia Fern | Squirrel's Foot |
| No. 5 | | Chinese Evergreen |
| No. 5a | Arabia Elegantisama Disygotheca | |
| No. 6 | Reiger Elatior Begonia | |
| No. 7 | | Hybrid Palm |
| No. 8 | | Boston Fern 6 inch Pot |
| No. 9 | | Boston Fern 8 inch Pot |
| No. 10 | | Shefflera |
| No. 11 | | Hydrangea |
| No. 12 | Caryota Palm | Fishtail Palm |

These plants were watered with the following solutions: The Control Group (regular nursery method) — a fertilizer described as 20-22-13 was used and the plants were sprayed with appropriate mildewcides when needed. The control group was watered 13 times in 70 days. The Experimental Group, used Formula II of Example II 40 ml diluted to 2 gallons of water and used for watering. Watering was accomplished every other day or 36 times in 70 days. Plants were sprayed with appropriate mildewcide when needed. Photographs of the plants were taken twice during the experimental period.

Within 6 to 7 days new growth and shoot production was evidenced on the experimental plants watered with solution, Formula II. No such new shoot production was comparable with the regularly watered plants. The experimental solution did not harm any of the plants watered. Certain of the plants showed superior growth with the experimental treatment. These are listed in Table 10 below.

Table 10

Plants that grew 30 to 100 percent faster than the control group

| Plant Number | Plant Name |
| --- | --- |
| No. 1 | Neantha Bella Palm |
| No. 2 | Ficus Lyrata "Fiddle Leaf Fig" |
| No. 3 | Dracaena Craigii |
| No. 6 | Reiger Elatior Begonia |
| No. 10 | Shefflera |
| No. 11 | Hydrangea |

The remainder of the plants were equal in size or slightly larger than the controls, but the spectacular differences were in those plants listed in Table 10 above.

The experimental group of plants watered with Formula II recovered more quickly, as evidenced by new shoot production, grew in size equal to or larger than the control group of plants. Six of the 12 plants grew 30 – 100 percent larger with Formula II than the control watered plants. Formula II, containing 0.018% w/v urea peroxide was safe for the list of plants.

EXAMPLE XV

A 5 gallon Eureka lemon tree was planted in heavy clay and allowed to adjust to the transplanting before the start of the experiment. A basin was dug around the trunk of the tree so that it would hold 2 gallons of water. The tree was watered every other day with 2 gallons of Formula II of Example II 40 ml diluted to 2 gallons of water. The tree was watered 60 times during 120 days. The experimental solution Formula II was then stopped and water was used to water the tree for approximately 1 month. After the 1 month period the tree was again watered with Formula II.

In the initial part of the experiment the tree was severely overwatered, in clay soil, but with no harmful effects. The tree grew at a rapid rate, new shoots and leaves continually appearing. Fruiting was not adversely affected. When water replaced the experimental solution, Formula II, leaves started to yellow and drop. Approximately 25 percent of the leaves dropped before watering again resumed using Formula II. After several waterings the leaves stopped dropping, using this solution. It was concluded that Formula II protects lemon trees from overwatering even in clay soils. Having a continuous supply of water and nutrients at the roots in the presence of urea peroxide, greatly increases the rate of growth of the tree, where as this is not possible in the absence of the peroxide.

EXAMPLE XVI

A bare root Apricot tree was planted in heavy clay soil and allowed to adjust to planting for approximately 6 months before treatment with the experimental solution, Formula II of Example II, 40 ml diluted to 2 gallons with water. A basin was prepared around the trunk of the tree to hold 2 gallons of solution. The tree was watered using 2 gallons of Formula II approximately every other day for a period of 120 days.

Even though the tree was severely overwatered, in clay soil, there were no harmful effects. The tree grew at a rapid rate with new shoots and leaves continually appearing, even when other disiduous trees in the yard were dropping their leaves. When the tree finally went shaken; 25 to 90 percent of the leaves had dropped from the various plants. New shoots would not open. Various conventional watering and fertilizing schedules were tried to save the plants without success.

The five plants were watered with Formula V of Example II, 5 ml diluted to 1 liter with water. For the first watering the plants were taken outdoors and the soil was flooded with 2 gallons of Formula V and let drain. The plants were then taken indoors and watered every other day for 12 days using 1 liter of experimental solution per watering. After the first watering, the leaves of the *Ficus benjamina* stopped dropping and after 1 week shoots began to open and new shoots began to grow. No further leaves dropped from the *Ficus pandurata* and shoots began to open approximately a month later.

The solution of Formula V stopped the leaf dropping, stimulated shoots to open and caused the production of new shoots. This solution containing 0.012% w/v urea peroxide reversed the overwatered condition of these plants.

EXAMPLE X

The effect and safety of Formula II of Example II was tested on a variety of potted plants (identified in Table 8 below), in which drainage was allowed. The plants used were obtained from a nursery. The plants were in poor condition, many of the leaves had dropped and no new growth or shoot production was evident. The experiment was accomplished outdoors.

The plants were flooded every second day with Formula II and Formula IV of Example II, 5 ml diluted to 1 liter with water or with water alone. The immediate effect of these solutions on the plants can be seen in Table 8 below.

EXAMPLE XI 25, 1 gallon size, Boxwood Hedges were planted outdoors in clay soil 6 months prior to the experiment. Five of the 25 Boxwood hedge plants were growing poorly and had a large number of yellow leaves on each plant. These plants were situated in an area where water pooled. These five plants were watered using the experimental solution Formula II of Example II, 40 ml diluted to 2 gallons of water, six times during a period of 22 days. By the end of the watering period the appearance of yellow leaves stopped. The plants started growing (they were stunted in comparison to the rest of the Boxwood plants). The plants began to turn green and new shoots developed.

EXAMPLE XII

An indoor grown Kentia palm with chlorosed leaves and brown leaf tips, was transplanted into a 5 gallon earthenware pot using Supersoil. The dead parts of the leaves were trimmed and dead branches removed. The plant was watered 63 times during a period of 127 days using 1 liter of diluted Formula II of Example II per watering.

After 12 days a new shoot opened. After 30 days three new shoots opened. The plant grew well. Toward the end of the experimental period some browning at the leaf tips was noticed.

EXAMPLE XIII

An indoor grown Reiger Begonia in a 6 inch pot, which had almost died was taken from its soil by washing the roots with a strong stream of water. The plant was severely trimmed back and planted into a heavy Table 8

| Plant | Plant Description | Number of times watered/days | Treatment Formula of Example II | 10 day observations |
|---|---|---|---|---|
| 1 | Boston Fern | 60/126 | II | Some new growth |
| 2 | Boston Fern | 60/126 | IV | Some new growth |
| 3 | Boston Fern | 60/126 | II | Some new growth |
| 4 | Boston Fern | 60/126 | IV | Some new growth |
| 5 | Fishtail Palm | 60/126 | II | No change |
| 6 | Reiger Begonia | 60/126 | II | New leaves- dark color |
| 7 | Reiger Begonia | 60/126 | II | New leaves- dark color |
| 8 | Reiger Begonia | 60/126 | IV | Leaves become dark colored |
| 9 | Reiger Begonia | 60/126 | WATER | No change |
| 10 | Tall Palm | 60/126 | II | Leaves become dark colored |
| 11 | Tall Palm | 60/126 | IV | Leaves become dark but burnt ends |
| 12 | Bella Palm | 60/126 | II | Leaves become dark new shoots appear |
| 13 | Bella Palm | 60/126 | II | Leaves become dark new shoots appear |
| 14 | Philidendron Panthos | 60/126 | II | New shoots appear- Rusted Wire Post |

Nutrients are taken up by the plants quickly, to dissipate the chlorosed look and make the leaves darker. The solution containing the peroxide stimulated greater shoot production, as compared to the controls, and plant recovery. Formula II did not harm any of the above plants when allowed to drain during the 126 day experimental period.

clay soil. The plant was sprayed with Benolate, a mildewcide. To the soil was added approximately ½ teaspoonful of manganese dioxide powder. The plant was watered 76 times during a period of 152 days using Formula II of Example II, 40 ml diluted to 2 gallons of water and the pot was flooded during each watering.

After 6 days of this treatment flowers opened which previously would not open. The plant grew well and became quite large. No toxic effects of manganese dioxide or the formula were noted during the experimental period.

EXAMPLE XIV

The indoor plants listed in Table 9 below, were selected in pairs and the pairs were so matched that they were equivalent in size, shape and condition.

Table 9

| PLANT NUMBER | FORMAL NAME | PLANT NAME COMMON NAME |
|---|---|---|
| No. 1 | *Chamaedorea Elegans Bella* | Neantha Bella Palm |
| No. 2 | *Ficus Lyrata* | "Pandurata" Fiddle Leaf Fig |
| No. 3 | *Dracaena Craigii* | |
| No. 4 | *Davalia Fern* | Squirrel's Foot |
| No. 5 | | Chinese Evergreen |
| No. 5a | *Arabia Elegantisama Disygotheca* | |
| No. 6 | *Reiger Elatior Begonia* | |
| No. 7 | | Hybrid Palm |
| No. 8 | | Boston Fern 6 inch Pot |
| No. 9 | | Boston Fern 8 inch Pot |
| No. 10 | | Shefflera |
| No. 11 | | Hydrangea |
| No. 12 | *Caryota Palm* | Fishtail Palm |

These plants were watered with the following solutions: The Control Group (regular nursery method) — a fertilizer described as 20-22-13 was used and the plants were sprayed with appropriate mildewcides when needed. The control group was watered 13 times in 70 days. The Experimental Group, used Formula II of Example II 40 ml diluted to 2 gallons of water and used for watering. Watering was accomplished every other day or 36 times in 70 days. Plants were sprayed with appropriate mildewcide when needed. Photographs of the plants were taken twice during the experimental period.

Within 6 to 7 days new growth and shoot production was evidenced on the experimental plants watered with solution, Formula II. No such new shoot production was comparable with the regularly watered plants. The experimental solution did not harm any of the plants watered. Certain of the plants showed superior growth with the experimental treatment. These are listed in Table 10 below.

Table 10

| Plants that grew 30 to 100 percent faster than the control group | |
|---|---|
| Plant Number | Plant Name |
| No. 1 | Neantha Bella Palm |
| No. 2 | *Ficus Lyrata* "Fiddle Leaf Fig" |
| No. 3 | *Dracaena Craigii* |
| No. 6 | *Reiger Elatior Begonia* |
| No. 10 | Shefflera |
| No. 11 | Hydrangea |

The remainder of the plants were equal in size or slightly larger than the controls, but the spectacular differences were in those plants listed in Table 10 above.

The experimental group of plants watered with Formula II recovered more quickly, as evidenced by new shoot production, grew in size equal to or larger than the control group of plants. Six of the 12 plants grew 30 - 100 percent larger with Formula II than the control watered plants. Formula II, containing 0.018% w/v urea peroxide was safe for the list of plants.

EXAMPLE XV

A 5 gallon Eureka lemon tree was planted in heavy clay and allowed to adjust to the transplanting before the start of the experiment. A basin was dug around the trunk of the tree so that it would hold 2 gallons of water. The tree was watered every other day with 2 gallons of Formula II of Example II 40 ml diluted to 2 gallons of water. The tree was watered 60 times during 120 days. The experimental solution Formula II was then stopped and water was used to water the tree for approximately 1 month. After the 1 month period the tree was again watered with Formula II.

In the initial part of the experiment the tree was severely overwatered, in clay soil, but with no harmful effects. The tree grew at a rapid rate, new shoots and leaves continually appearing. Fruiting was not adversely affected. When water replaced the experimental solution, Formula II, leaves started to yellow and drop. Approximately 25 percent of the leaves dropped before watering again resumed using Formula II. After several waterings the leaves stopped dropping, using this solution. It was concluded that Formula II protects lemon trees from overwatering even in clay soils. Having a continuous supply of water and nutrients at the roots in the presence of urea peroxide, greatly increases the rate of growth of the tree, where as this is not possible in the absence of the peroxide.

EXAMPLE XVI

A bare root Apricot tree was planted in heavy clay soil and allowed to adjust to planting for approximately 6 months before treatment with the experimental solution, Formula II of Example II, 40 ml diluted to 2 gallons with water. A basin was prepared around the trunk of the tree to hold 2 gallons of solution. The tree was watered using 2 gallons of Formula II approximately every other day for a period of 120 days.

Even though the tree was severely overwatered, in clay soil, there were no harmful effects. The tree grew at a rapid rate with new shoots and leaves continually appearing, even when other disiduous trees in the yard were dropping their leaves. When the tree finally went into dormancy it lost all its leaves except for the outer foot of leaves on each branch, where new shoots continued to grow. Continuous soaking of the soil with Formula II causes increased growth and delays dormancy of the apricot tree.

EXAMPLE XVII

Two Sun Azalea were planted outdoors in peatmoss. One plant was watered every other day using 2 gallons of diluted Formula II of Example II. The plant was watered 47 times during a period of 108 days. The other plant was watered with water only. Azalea fertilizer was used on both plants. Formula II did not harm the Azalea plant. The treated plant grew much larger than the control during the experimental period.

EXAMPLE XVIII

A multiholed pot was planted with Geranium cuttings. These plants were watered every other day with Formula II of Example II, 40 ml diluted to 2 gallons of water. The plant was watered 58 times during 117 days.

The Geraniums thrive under this treatment. They grow faster than would be normal and the flowering is excellent.

EXAMPLE XIX

Into two undrained pots, outdoors, containing clay soil, Marigold plants were planted. One pot was watered every other day or 22 times during a period of 45 days using Formula II of Example II, 40 ml diluted to 2 gallons of water, while the control plants were watered using water only. The plants watered with the experimental solution, Formula II, grew much larger, nearly twice the size, of the control plants. Flowering was excellent.

EXAMPLE XX

A large drained pot outdoors, was planted with Pansies using Supersoil. These plants were watered every other day with Formula II of Example II, 40 ml diluted to 2 gallons of water, for a period of approximately 2 months.

The pansies grew well with this treatment and flowering was excellent.

EXAMPLE XXI

A section of lawn, a mixture of Kentucky blue grass and Bent grass, was watered twice using Formula II of Example II, 40 ml diluted to 2 gallons of water. After 2 days the experimental solution caused the grass to grow higher and greener than the watered only section. This solution can be adapted as a lawn fertilizer, and does not harm this type of grass.

EXAMPLE XXII

A Fiddle Leaf Philodendron (Elephant Ears), indoor plant, was watered using Formula II of Example II, 40 ml diluted to 2 gallons of water, every other day or 45 times during a 91 day period.

After 6 days new shoots developed and after 9 days two new leaves opened. The solution did not affect the plant adversely, but rather stimulated growth.

EXAMPLE XXIII

A multiholed pot was planted with strawberry plants. The plants were watered 54 times during a period of 108 days, using Formula II of Example II, 40 ml diluted to 2 gallons of water. Approximately 2 gallons of solution was added every other day. The plant was extremely full looking, normal strawberries were produced and the plants reproduced normally with runners. Formula II was not damaging to Strawberry plants and stimulated growth.

EXAMPLE XXIV

A number of plants were grown with Formula II of Example II. These include Creeping Charlie, a Miniature Nectarine in a pot, a Ginny Goldvine and a Bougainvillea planted in the ground. No toxic effects were noted and the plants grew well.

I claim:

1. A method of improving plant appearance and preventing injury to plants from overwatering comprising treating support media adjacent to a plant's roots with an effective amount of urea peroxide or hydrogen peroxide.

2. The method of claim 1 wherein the support media is additionally treated with a catalytically effective amount of manganese dioxide.

3. The method of claim 1 wherein the urea peroxide or hydrogen peroxide is contained in an aqueous composition.

4. A method of prolonging the growth period of desiduous plants comprising treating the support media adjacent to a desiduous plant's roots with an effective amount of urea peroxide or hydrogen peroxide.

5. The method of claim 4 wherein the support media is additionally treated with a catalytically effective amount of manganese dioxide.

6. The method of claim 4 wherein the urea peroxide or hydrogen peroxide is contained in an aqueous composition.

7. A method of enhancing production of solids in tomatoes comprising treating the support media adjacent to the roots of a tomato plant with an effective amount of urea peroxide or hydrogen peroxide.

8. The method of claim 7 wherein the support media is additionally treated with a catalytically effective amount of manganese dioxide.

9. The method of claim 7 wherein the urea peroxide or hydrogen peroxide is contained in an aqueous composition.

10. A method for improving the appearance of overwatered plants comprising treating the support media adjacent to the roots of an overwatered plant with an effective amount of urea peroxide or hydrogen peroxide.

11. The method of claim 10 wherein the support media is additionally treated with a catalytically effective amount of manganese dioxide.

12. The method of claim 10 wherein the urea peroxide or hydrogen peroxide is contained in an aqueous composition.

* * * * *